Figure 1A:
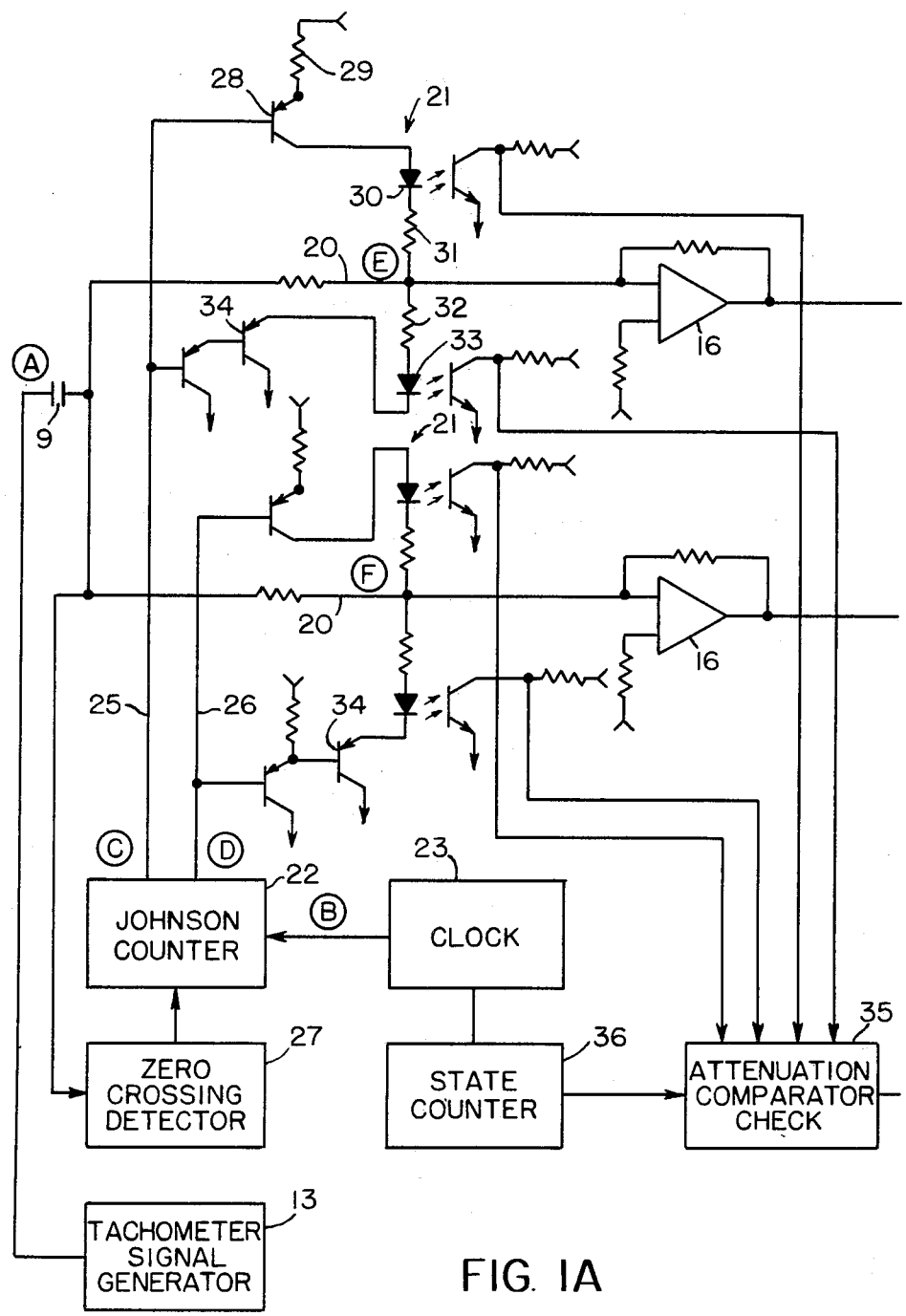

United States Patent [19]

Sibley et al.

[11] 4,365,298
[45] Dec. 21, 1982

[54] SPEED CONTROL SYSTEMS FOR GOVERNING THE SPEED OF A VEHICLE

[75] Inventors: Henry C. Sibley, Adams Basin; David B. Rutherford, Jr., Rochester, both of N.Y.

[73] Assignee: General Signal Corporation, Stamford, Conn.

[21] Appl. No.: 146,884

[22] Filed: May 5, 1980

[51] Int. Cl.³ .................... B60K 31/00; G05D 13/62
[52] U.S. Cl. ................................. 364/426; 180/179; 235/92 EC; 235/92 NT; 340/670
[58] Field of Search ........ 235/92 CT, 92 GD, 92 FQ, 235/92 TF; 371/68; 307/358, 362, 355, 356; 364/424, 426; 180/179; 340/53, 670; 328/134

[56] References Cited

U.S. PATENT DOCUMENTS 3,525,044  8/1970  Richmond .................... 235/92 FQ
3,868,570  2/1975  Kopera, Jr. .................. 235/92 FQ
4,084,659  4/1978  Abend ............................... 180/179

Primary Examiner—Felix D. Gruber
Attorney, Agent, or Firm—Harold S. Wynn; Milton E. Kleinman

[57] ABSTRACT

A tachometer signal provides input to first and second parallel connected channels, each of the channels comprising in series operational amplifier, threshold detector, and counting devices. A comparator checks that the same count is registered by the counters of both channels. Each of the threshold detectors is biased to require a minimum amplitude over and under tachometer pulse input in order to deliver an output to the pulse counter of the associated channel. Attenuating circuits act on the inputs of the operational amplifiers of both channels during predetermined intervals to check that the amplitude of the tachometer pulses is sufficient to be counted by the tachometer counters. Dynamic checking circuits are provided to check the integrity of the attenuating system.

10 Claims, 4 Drawing Figures

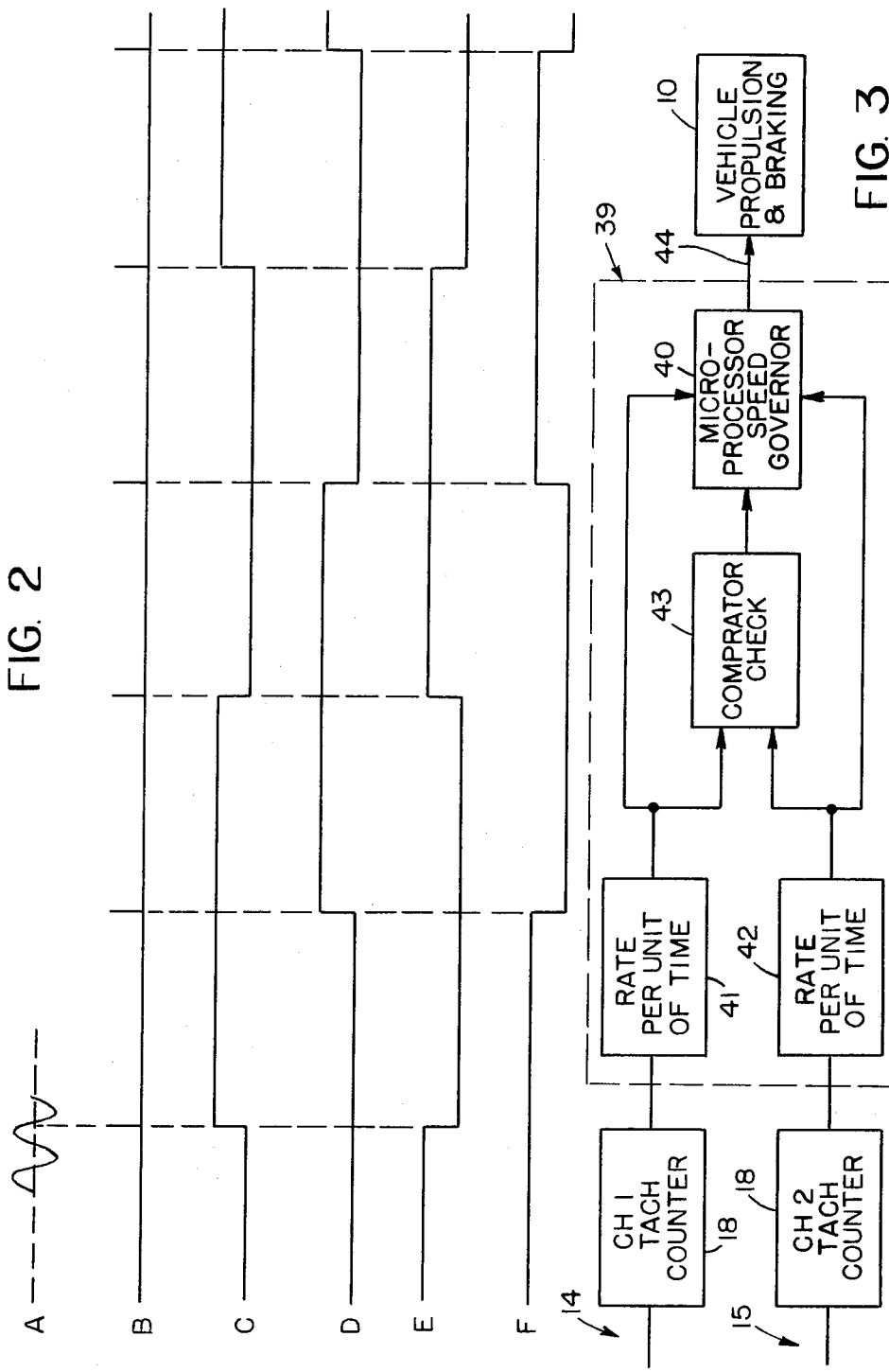

SPEED CONTROL SYSTEMS FOR GOVERNING THE SPEED OF A VEHICLE

REFERENCE TO PRIOR CASES

This invention is related to prior speed governor systems disclosed in the Wilcox U.S. Pat. No. 3,482,090, and in prior U.S. Application of Sibley Ser. No. 873,574, assigned to the same assignee as the present invention. The present invention can also be used in a microprocessor speed control system such as is disclosed in the Zitelli et al U.S. Pat. No. 4,133,615. The disclosures of these patents are hereby incorporated by reference for a more detailed disclosure of parts of the present invention that are considered old in the art.

BACKGROUND OF THE INVENTION

This invention relates to speed control systems, and, while the invention is subject to a wide range of applications, a preferred embodiment of the invention will be particularly described as applied to a speed control system for a vehicle.

In speed control systems for governing a vehicle, a turbine, and the like, speed regulation is accomplished by comparing a desired speed signal with a feedback signal characteristic of actual speed. The actual speed signal can be generated as an alternating current signal by an axle driven generator, for example, wherein the frequency of the signal is related to actual speed. Various systems have been disclosed for checking the integrity of the alternating current actual speed signal to ensure safety in a speed governor system, such as the system disclosed in the Wilcox U.S. Pat. No. 3,482,090, which is assigned to the same assignee as the present invention. According to this patent, the frequency of the actual speed signal is compared with a desired frequency setting of a frequency detector to determine a speed limit at which the vehicle can be operated. Integrity of the actual speed signal sensing means in this patent is provided by a checking oscillator organization that checks the circuitry and the cutoff range of the frequency detector. The integrity checking is to insure continuity of axle driven generator circuits for generating a pulse rate indicative of the actual speed of the vehicle. This system is sufficient for vehicles operating under normal headway, but conditions may be encountered where faster response is required, for example, for vehicle operating under closer headway at higher speed.

An object of the present invention is to provide an improved speed governor system which substantially obviates one or more of the limitations and disadvantages of the described prior art systems.

Another object of the present invention is to simplify speed governor systems by eliminating the need for frequency detectors and checking oscillators such as have been required according to the prior art.

Another object of the present invention is to provide an actual speed signal checking system that senses quickly an abnormal actual speed signal.

Other objects, purposes and characteristic features of the present invention will be in part obvious from the accompanying drawings, and in part pointed out as the description of the invention progresses.

SUMMARY OF THE INVENTION

A speed control system is provided for governing the speed of a vehicle comprising a tachometer signal generator for generating a signal having a frequency (pulses per unit of time) characteristic of the actual speed of a vehicle, a desired speed signal generator for generating a signal indicative of a desired speed for the vehicle, and a vehicle control system governed jointly by the tachometer signal and the desired speed signal for governing the speed of the vehicle.

First and second parallel connected channels are responsive to the tachometer signal, each of the channels comprising an operational amplifier, a threshold detector, and a tachometer counter for counting tachometer pulses. Each of the threshold detectors is biased to require a minimum amplitude of tachometer pulse input to the threshold detector in order to deliver an output to the pulse counter of the associated channel.

Tachometer pulse attenuating means is provided for acting on tachometer pulse inputs in each of the channels to associated operational amplifiers for periodically testing that unattenuated tachometer pulses are at least a fixed amplitude above the threshold setting of the threshold detectors. An attenuation enabling counter renders the attenuation of the respective channels effective at different combinations of times during successive cycles of operation of the attenuation enabling counter. If an attenuated pulse is operable to generate an output of the threshold detector of the associated channel, it is determined that the tachometer pulse has sufficient amplitude above the threshold setting of the threshold detector to ensure operation of the tachometer pulse counter of the associated channel.

The outputs of the two channels should therefore be substantially the same at all times if outputs of the threshold detectors of both channels are generated for all tachometer pulses even though the amplitude of some of the pulses are attenuated. This check is made by a comparator that compares the counts in the counters for the two channels, and permits the speed governor system to continue to operate only so long as the counts in the two counters substantially correspond.

For a better understanding of the present invention, together with other further objects thereof, reference is had to the following description, taken in connection with the accompanying drawings, while its scope will be pointed out in the appended claims.

IN THE DRAWINGS

Figure 1B:
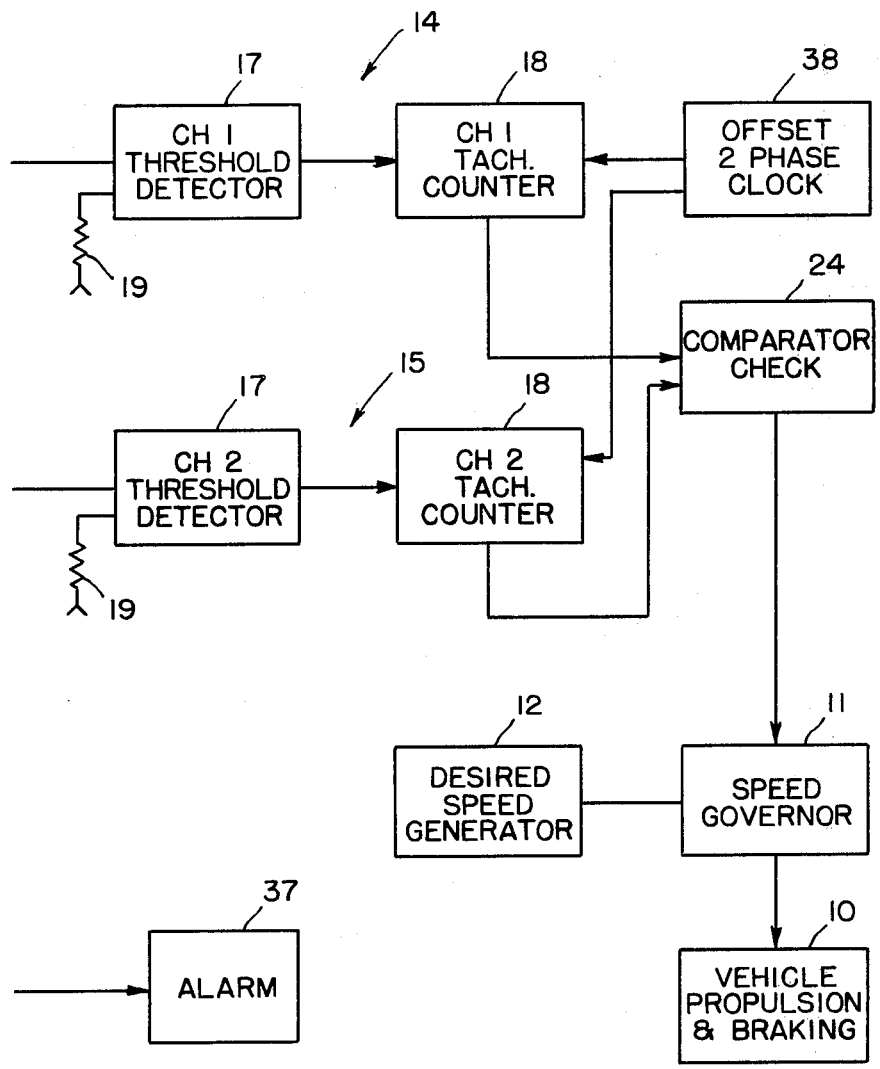

FIGS. 1A and 1B, when placed side by side, are a schematic diagram of a speed control system for governing the speed of a vehicle according to a preferred embodiment of the present invention;

FIG. 2 is a wave form diagram illustrating conditions of energization of the system shown in FIGS. 1A and 1B; and, FIG. 3 illustrates a modification of the speed control system of FIGS. 1A and 1B.

With reference to FIGS. 1A and 1B vehicle propulsion and braking apparatus 10 is governed by a speed governor 11, which is in turn controlled by desired speed generating apparatus 12 and tachometer signal generating apparatus 13. This apparatus is well known, as in the above-mentioned Wilcox U.S. Pat. No. 3,482,090. Output of tachometer signal generator 13 is applied to first and second channels 14 and 15 respectively through a capacitor 9 for checking that tachometer pulses are enough above a threshold value to assure accurate calculation of the actual speed of the vehicle when counting the tachometer pulses.

Each of the channels 14 and 15 comprises in series, an operational amplifier 16, an over and under threshold detector 17 and a tachometer counter 18. The threshold detectors 17 are biased by suitable biasing circuit means 19 for requiring a fixed minimum amplitude tachometer pulse input to the associated threshold detector 17 to generate an over and under Schmitt trigger output for each tachometer pulse. To ensure that all tachometer pulses are of sufficient amplitude to be counted, input tachometer pulses on each of lines 20 of the respective first and second channels are periodically attenuated by attenuating circuits 21 to an extent to reduce the amplitude of these pulses below a value to generate outputs of the threshold detectors 17 in case the unattenuated tachometer pulses are materially below normal value. The attenuating apparatus 21 is selectively rendered effective for the respective first and second channels by enabling apparatus comprising a Johnson counter 22 driven by a clock 23. Comparator check apparatus 24 is provided for comparing tachometer pulse counts in the counters 18 of the two channels to sense any substantial difference in counts as an indication that at least some of the tachometer pulses are of insufficient amplitude to be relied on for an accurate count as an indication of the actual speed of the vehicle.

In operation, the Johnson counter 22 is continuously driven by the clock 23 to alternately change the condition of attenuation of the input to operational amplifier 16 for the respective first and second channels 14 and 15. Each step of the Johnson counter 22 will change the condition of an attenuating circuit 21 for one of the channels, only one of the channels being changed at a time in order to ensure that any noise due to the switching cannot be counted as a tachometer pulse by both channels at the same time to provide an erroneous count of the tachometer pulses. If an erroneous count should be provided by noise signals, this would be detected by the comparator 24, because the tachometer counters 18 would not correspond.

With reference to the wave forms of FIG. 2, the line A represents the input to the channels of a signal generated by the tachometer signal generator 13, and the line B represents clock pulses generated by clock 23 for driving the Johnson counter 22. For the conditions illustrated in FIG. 2, the attenuating apparatus 21 is illustrated by lines E and F as initially being enabled by there being low outputs on both lines C and D (wires 25 and 26 of FIG. 1) which are both low to enable the attenuating apparatus 21 for first and second channels 14 and 15 respectively. The next output of the clock 23 shifts the Johnson counter 22 to change output line 25 from low to high energization, as is shown on line C of FIG. 2, to turn off the attenuating circuit 21 for the first channel 14 as is illustrated on line 3 of FIG. 2, while maintaining attenuation of input to operational amplifier 16 for the second channel 15 as is illustrated by line F of FIG. 2.

The Johnson counter 22 is shifted during zero crossing of the tachometer signal by a zero crossing detector 27 as is indicated in FIG. 2 to minimize possibility of noise generation in the switching from low to high for the first channel, while the wire 25 is maintained at its high energization condition to provide that there is no attenuation of the tachometer signal on either of the first and second channels during the next following interval. The third clock pulse causes wire 25 to be shifted from high to low energization for turning on the attenuating apparatus 21 of the first channel 14, and, similarly, wire 26 is shifted from high to low energization during the next pulse of clock 23 to again render the attenuating apparatus 21 effective for the second channel 15 and thus complete a four step cycle of the Johnson counter for successively attenuating the first and second channels 14 and 15 respectively in different combinations during a four step cycle.

The attenuating apparatus 21 associated with each of the channels comprises a voltage divider circuit having transistor switches at both of its ends, controlled by an output wire 25 or 26 of the Johnson counter, to turn the switches on when the associated output wire 25 or 26 goes low, and to turn the switches off when the corresponding output wire 25 or 26 goes high. The attenuating circuit 21 for the first channel 14, for example, has energy applied from plus, at its upper end by a transistor switch 28 to energize the attenuating circuit for channel 14 through a resistor 29, a transistor 28, optical isolator diode 30, resistor 31, a connection to channel wire 20, resistor 32, isolator diode 33, and a switching transistor 34, to minus. Alternately, the switching could be accomplished by open drain gates.

It is therefore provided that a dynamic test is performed every cycle of operation of the Johnson counter 22 to ensure that the incoming tachometer pulses are well above threshold value. The input channels 14 and 15 are alternately attenuated a fixed amount such as 6 db, and if the unattenuated signal is closed to threshold level of the threshold detectors 17, the attenuated signal will be substantially below threshold, and the frequency counts for the two channels as registered in counters 18 will be different, and will be detected by the comparator check 24.

The attenuators themselves are dynamically checked through series optical isolators in the attenuator circuit 21 for proper sequential operation. To provide this check, optical isolators are provided in each channel as has been typically described for the first channel 14 wherein the optical isolators 30 and 33 are included in the series attenuating circuit 21 on opposite sides of the input wire 20 wherein they generate low signal outputs respectively when the attenuating circuit portions which they check are turned on. Outputs of the optical isolators for both the first and second channels 14 and 15 are applied to an attenuation comparator check circuit 35 which is in turn driven by a state counter 36 that is adapted to anticipate the conditions of attenuation that should be selected during each cycle of operation of the Johnson counter 22. Thus the state counter 36 is driven by the same clock 23 that is used to drive the Johnson counter 22. In case the attenuation comparator check 35 senses that attenuation is not being provided as intended, an output is delivered to a suitable alarm 37 to register the abnormal condition.

The tachometer counters 18 for the first and second channels 14 and 15 respectively are driven by separate outputs of a suitable offset two phase clock 38. The comparator check circuit 24 delivers an output to the speed governor 11 only provided there is no substantial out of correspondence condition between tachometers 18 for the respective channels 14 and 15. In case an out of correspondence condition is detected by the comparator check 24 above a predetermined number of counts, a control is provided for a suitable alarm such as the alarm 37 that has been illustrated as being associated with the checking of the attenuating circuits.

With reference to FIG. 3, it is illustrated that the tachometer signal checking system, as it has been described, can also be applied as input to a micro-processor system 39, such, for example, as the micro-processor system disclosed in the prior Sibley U.S. Application Ser. No. 873,574. The micro-processor speed governor 40 shown in FIG. 3 can be programmed to operate according to the micro-processor of the above-mentioned Sibley application, the input to the micro-processor speed governor 40 being from the first and second channels 14 and 15 which are comparable to "diversity means 40" of FIG. 1 of the Sibley application.

Rather than applying outputs of the channel counters directly to the micro-processor 40, it is preferable that the tachometer counters 18 be sampled during time intervals of each cycle of operation of the micro-processor 40, as represented by pulses per unit of time counters 41 and 42 provided for the channels 14 and 15 respectively, the output of which being compared in the micro-processor by a comparator check system 43 comparable to comparator checking apparatus that is disclosed in the Sibley application. This is done by generating a comparator check word that determines whether the micro-processor speed governor 40 will be permitted to deliver an output on line 44 to the vehicle propulsion and braking apparatus 10.

It is also understood that, in the system according to FIG. 3, the comparator checking means 43 can be programmed according to the teachings of the Sibley application to provide the dynamic check of the attenuating apparatus by adding to the micro-processor a predetermined pattern corresponding to the state counter 36 of FIG. 1A, and by use of the output of the optical isolators as flags for checking the attenuation circuits 21 so that this check can also be incorporated in the comparator check 43 of FIG. 3 for generating a check word to govern output of the micro-processor speed governor over line 44 to the vehicle propulsion and braking apparatus 10.

Having thus described a speed control system for governing the speed of a vehicle having improved means for checking the integrity of a tachometer signal to control a speed governor as a preferred embodiment of the present invention, it is to be understood that various modifications and alterations may be made to the specific embodiment shown without departing from the spirit or scope of the invention.

What is claimed is:

1. A speed control system for governing the speed of a vehicle comprising tachometer signal generating means for generating a tachometer signal having a frequency characteristic of the actual speed of the vehicle, desired speed signal generating means for generating a signal indicative of a desired speed for the vehicle, and vehicle control means governed jointly by the tachometer signal generating means and the desired speed signal generating means for governing the speed of the vehicle, wherein improved tachometer signal checking means comprises:

(a) first and second parallel connected channel means responsive to the tachometer signal for checking that tachometer pulses are enough above a threshold detector value to assure accurate calculation of the actual speed of the vehicle when counting the tachometer pulses, (b) each of the channel means comprising in series operational amplifier means, threshold detector means, and tachometer pulse counting means for counting tachometer pulse outputs of each of the channels, (c) biasing means for each of the threshold detector means for requiring a minimum amplitude tachometer pulse input to each threshold detector means to deliver an output to the pulse counting means of the associated channel, (d) tachometer pulse attenuating means for acting on tachometer pulse inputs in each of the channels for periodically testing that attenuated tachometer pulses are at least above the threshold setting of the threshold detector for the associated channel, (e) attenuation enabling means for selectively rendering the attenuating means effective for the respective channels during predetermined intervals, and (f) comparator check means for checking that the substantially same number of tachometer pulses is counted by both channels before permitting the count of the tachometer pulses to normally generate an output enabling continued progress of the vehicle.

2. A speed control system for governing the speed of a vehicle according to claim 1 wherein the attenuation enabling means comprises enabling counter means delivering an output to the attenuating means for the first and second channels respectively, (a) the enabling counter means being operable during a cycle of its operation to enable a plurality of different combinations of instantaneous attenuation or no attenuation of the tachometer pulses applied to the first and second channels during a cycle of its operation.

3. A speed control system for governing the speed of a vehicle according to claim 2 wherein the enabling counter means operates through successive four step cycles to enable the selective attenuation or no attenuation of the two channels in different combinations during the respective four steps of each cycle of operation of the enabling counter means.

4. A speed control system for governing the speed of a vehicle according to claim 3 wherein the attenuation enabling means is operable to change state of only one of the channels during each step of the enabling counter means.

5. A speed control system for governing the speed of a vehicle according to claim 1 or claim 3 wherein the attenuation enabling means is governed by the tachometer signal generating means to permit a change of state of the attenuating means only during a time of zero crossing of the tachometer signal.

6. A speed control system for governing the speed of a vehicle according to claim 1, wherein the pulse attenuating means comprises:

(a) voltage dividing means for each channel connected at an intermediate point to an input of the operational amplifier for the associated channel, and (b) the voltage dividing means having electronic switching means for each channel governed by the attenuation enabling means for determining when the attenuating means is to be rendered effective for that channel.

7. A speed control system for governing the speed of a vehicle according to claim 6 wherein the electronic switching means comprises an electronic switch at each end of the voltage dividing means associated with each channel, the electronic switches for each channel being enabled to be turned on and off at the same time by the attenuation enabling means.

8. A speed control system for governing the speed of a vehicle according to claim 1 or claim 7 wherein said attenuation checking means is provided for sensing that the attenuating means is effective or ineffective upon inputs to the operational amplifiers of the channels respectively at predetermined expected times.

9. A speed control system for governing the speed of a vehicle according to claim 8 wherein said attenuation checking means is provided for sensing that the attenuating means is effective or ineffective upon inputs to the operational amplifiers of the respective channels comprising, (a) optical isolator diodes in series in the voltage dividing means for sensing whether or not the pulse attenuating means is turned on for the associated channels, and (b) comparator means sensing the on and off conditions of the isolator diodes and comparing these conditions with expected conditions as determined by the attenuation enabling means to normally generate an output enabling continued progress of the vehicle.

10. A speed control system for governing the speed of a vehicle according to claim 9 wherein the optical isolator diodes are included in series in the voltage dividing means between the electronic switches and the intermediate point of the voltage dividing means respectively for each channel.

* * * * *